(12) United States Patent
Griemla

(10) Patent No.: US 9,238,385 B2
(45) Date of Patent: Jan. 19, 2016

(54) BICYCLE HUB AND METHOD FOR THE PRODUCTION THEREOF

(75) Inventor: Horst Griemla, Steinhagen (DE)

(73) Assignees: Stefan Griemla, Düsseldorf (DE); Nicole Griemla, Rheine (DE)

( * ) Notice: Subject to any disclaimer, the term of this patent is extended or adjusted under 35 U.S.C. 154(b) by 383 days.

(21) Appl. No.: 13/576,654

(22) PCT Filed: Feb. 9, 2011

(86) PCT No.: PCT/EP2011/051879
§ 371 (c)(1),
(2), (4) Date: Aug. 1, 2012

(87) PCT Pub. No.: WO2011/098476
PCT Pub. Date: Aug. 18, 2011

(65) Prior Publication Data
US 2012/0306258 A1    Dec. 6, 2012

(30) Foreign Application Priority Data

Feb. 9, 2010   (DE) .......................... 10 2010 000 343

(51) Int. Cl.
*B60B 27/02* (2006.01)
*B60B 27/04* (2006.01)

(52) U.S. Cl.
CPC ............. *B60B 27/047* (2013.01); *B60B 27/023* (2013.01)

(58) Field of Classification Search
CPC ............ B60B 27/023; B60B 2310/206; B60B 2310/211; B60B 2310/212
USPC ........... 29/864.32; 301/110.5, 110.6; 72/347, 72/348
See application file for complete search history.

(56) References Cited

U.S. PATENT DOCUMENTS

| | | | | |
|---|---|---|---|---|
| 2,997,145 A | * | 8/1961 | Ross | 192/217.7 |
| 3,170,549 A | * | 2/1965 | Baker, III | 192/217.6 |
| 3,695,084 A | * | 10/1972 | Siemonsen et al. | 72/348 |
| 3,695,729 A | * | 10/1972 | Schwerdhofer | 301/64.702 |
| 3,733,881 A | * | 5/1973 | Grigorenko | 72/349 |
| 4,351,569 A | * | 9/1982 | Steuer et al. | 301/6.9 |
| 4,861,316 A | * | 8/1989 | Welschof | 464/145 |
| 5,664,329 A | * | 9/1997 | Nickel | 29/894.324 |
| 5,761,949 A | * | 6/1998 | Dalessandro et al. | 72/325 |
| 5,899,539 A | * | 5/1999 | Lin et al. | 301/110.5 |
| 6,179,891 B1 | * | 1/2001 | Knudsen et al. | 55/502 |
| 6,899,401 B2 | * | 5/2005 | Schlanger | 301/59 |
| 2008/0189944 A1 | * | 8/2008 | Rorig et al. | 29/888.2 |

FOREIGN PATENT DOCUMENTS

FR    475722    6/1915
FR    576128    8/1924
(Continued)

Primary Examiner — Jason Bellinger
(74) Attorney, Agent, or Firm — Smartpat PLC

(57) ABSTRACT

A bicycle hub is made of shaped sheet metal. The bicycle hub comprises two flanges (6, 7) which are located at end sections (3, 4) of the hub. The flanges (6, 7) comprise holes (11) for accommodating spokes, and are bent radially outwards and held at a distance from one another by a sleeve (5; 50). The end sections (3, 4) further comprise internal ball tracks (8). The end sections (3, 4) are designed such that each of the end sections (3, 4) is formed as a double wall comprising an inner wall and a closely fitting and abutting outer wall at least in the ball track area (8), whereby the flange (6, 7) is attached to the outer wall.

14 Claims, 4 Drawing Sheets

(56) References Cited

FOREIGN PATENT DOCUMENTS

| | | | | |
|---|---|---|---|---|
| FR | 576128 A | * | 8/1924 | ............ B60B 27/023 |
| FR | 2732733 | | 10/1996 | |
| FR | 2732733 A3 | * | 10/1996 | ............ B60B 27/023 |
| JP | 51-124740 | | 4/1950 | |
| JP | 52-36457 | | 9/1950 | |
| JP | 55-114603 | | 9/1980 | |
| JP | 08-281359 | | 10/1996 | |
| JP | 10-297205 | | 11/1998 | |

* cited by examiner

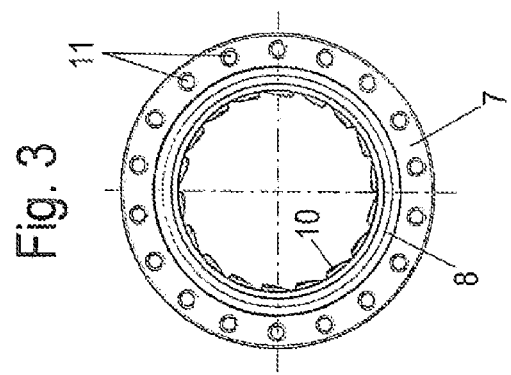
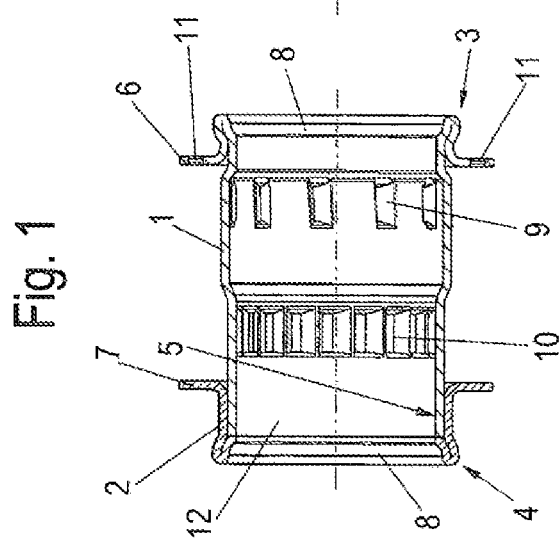
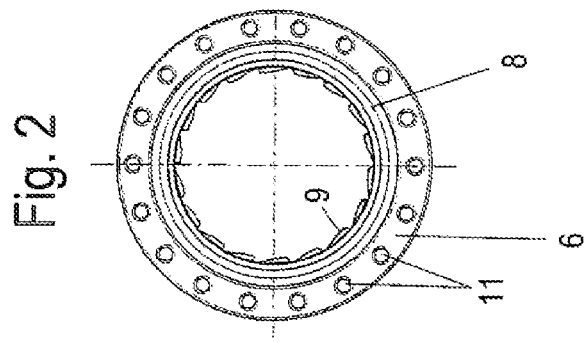

BICYCLE HUB AND METHOD FOR THE PRODUCTION THEREOF

TECHNICAL FIELD

The present disclosure generally relates to a bicycle hub and more specifically to a bicycle hub made of shaped sheet metal and a method for the production thereof.

BACKGROUND

Bicycle hubs, especially those that have internal gear teeth for a backpedal brake with freewheel as well as internal gear teeth as the mating part for a hub gear, have until now been forged from a tube and finished by machining. The conventional method for producing a bicycle hub comprises steps of provisioning internal gear teeth and drilling holes in formed flanges, into which spokes are then mounted. Internal ball tracks at the ends of the bicycle hub are also finished by machining, specifically by turning.

These machining operations require considerable effort, which leads to correspondingly high finishing costs. Consequently, known bicycle hubs are exceptionally expensive when compared with other parts of a bicycle.

Furthermore, these forged bicycle hubs are relatively heavy, as their wall must be sufficiently thick to be shaped by means of forging and machining. However, this relatively high weight is contrary to a general desire to make bicycle parts as light weight as possible.

In order to avoid these disadvantages, it is recommended in DE 2906627 C2 (also published as U.S. Pat. No. 4,351,569) that a bicycle hub be formed as a sheet metal part with two hub elements, each of which is manufactured by deep drawing. Both the hub elements are connected to one another either by positive locking or bonding, whereby pressing or riveting is recommended for achieving positive locking, and adhesion or welding for bonding.

Deformation is necessary for pressing, which can affect the concentricity of the bicycle hub. Welding on the other hand leads to warping of the hub elements, which can only be rectified by subsequent straightening. In either case, additional cost-increasing operations are necessary in order to connect the two hub elements with one another.

Furthermore, the usual construction leads to the ball tracks having different diameters, which leads to drawbacks with respect to usage. In particular, it is not possible to use either of the hub elements as the base for different hub gears mounted on the inside of a bicycle hub.

Any desired optimization in the bicycle hub's weight is restricted by the loads arising in the ball track area during running, which requires the hub elements to have a certain wall thickness. This wall thickness is substantially constant across known bicycle hubs, i.e. the wall thickness is determined only by the load discussed above.

Another drawback of known bicycle hub is that both the wheel flanges are different with regard to their distance from the respective front side of the bicycle hub, such that one end of the bicycle hub projects outward beyond the attached spokes.

Both flanges shown and described in U.S. Pat. No. 2,997,145 are affixed to the sleeve of the bicycle hub also mainly by welding or soldering. To this extent, the aforementioned drawbacks that arise from bonding also arise with this bicycle hub.

SUMMARY

The primary objective of this disclosure is to provide a bicycle hub that can be simply and cost-effectively produced from relatively thin sheet metal without compromising the hub's load capacity. This objective is achieved by a bicycle hub made of shaped sheet metal which comprises two end sections that are connected at a predetermined distance by a sleeve. Each of the end section comprises a double wall made of an inner wall and an abutting outer wall layer of sheet metal. A radially outwardly extending flange is provided and comprises holes for accommodating spokes. The radially outwardly extending flange is connected to the outer wall. Ball tracks are formed in the double wall.

The disclosed bicycle hub can be produced by shaping relatively thin sheet metal having a thickness of about 1.8 mm. The bicycle hub attains a very high load-bearing capacity by shaping the sheet metal into a double-wall in the respective ball track area. The double wall is produced by reverse drawing and comprises an inner wall layer of sheet metal which abuts an outer wall layer of sheet metal.

The bicycle hub may be produced as one piece by deep drawing and re-forming a round metal blank, especially a closed blank, whereby the base is separated after deep drawing into a cup form and the end sections are correspondingly re-formed.

The fact that the bicycle hub is a single piece significantly reduces the manufacturing cost, as on the one hand almost all operations are possible in an uninterrupted, continuous and automatic flow, and on the other hand the use of material is optimized.

It is also feasible, however, to produce each of the end sections individually and then connect them to one another by a sleeve. The sleeve may be a separate part. Alternatively, the sleeve may be formed on one of the end sections, i.e. the sleeve and one end section may be one integral part. The other end section is then made as a separate bicycle hub part, and is attached onto that side of the sleeve that is opposite the formed end section.

While doing so, the end section or end sections are connected to the sleeve by friction fit, for which the matching diameters are designed for an interference fit. Surprisingly it was found, that friction fit connects the hub elements without letting them rotate, and is sufficiently strong to withstanding all loads encountered by the hub during use.

Since, contrary to prior art, heating is no longer necessary for connecting the individual parts, the risk of thermal stress arising and the warping that it causes have been eliminated. Thus, the disclosed bicycle hub attains a considerable level of improvement in quality, at least without subsequent machining.

The end sections or an end section with the attached sleeve are manufactured from a solid round blank. A first process step of "deep drawing" forms a cup. In a subsequent process step the cup's base is cut out, leaving a substantially cylindrical semi-finished hub element that is open on both sides.

End sections of the semi-finished hub element are created by reverse drawing, forming a double wall with an abutting inner and outer wall layer.

The respective flanges are formed by bending the outer wall layer radially outwards. The associated peripheral area of the inner side is formed into a ball track. The processes of reverse drawing, forming the flange and shaping the ball track can be done in one operation. Another step comprises perforating the flange, wherein holes for mounting spokes are punched into the flange.

A hub gear may require internal gear teeth. These may be produced by cold forming, whereby the internal gear teeth can be provided circumferentially on one of the two hub elements or on both the hub elements. The internal gear teeth can be produced with particular ease by pressing the cylindrical wall of the sleeve.

The process can be carried out in an automatic workflow for which appropriate forming machines are located in series, while the respective semi-finished product from which the bicycle hub is eventually made can be fed by automatic loaders. This automatic workflow enables the bicycle hub to be produced in a particularly cost-effective manner, since, among other things, the finishing time is considerably shorter than for a bicycle hub produced according to prior art.

Moreover, the relatively low material use also contributes to the minimization of costs, which results from the relatively low wall thickness of the sheet metal used, which benefits from sufficient stability due to the wall being doubled in the ball track area.

In another aspect the double wall may be extended to an overlapping area with brake shoes, which are part of a back-pedal brake and which are pressed against the inner wall of the sleeve when deployed, that is, when braking. The radial forces that arise during such braking are absorbed by the double wall, such that any deformation of the bicycle hub in this area is practically ruled out.

In spite of the low wall thickness, which incidentally remains essentially unchanged during deformation into the hub elements, the new bicycle hub ensures the necessary stability. Contributing to this is the fact that the deformation gives rise to grooves around the hub elements, for instance in the flange area, which further increases dimensional stability.

The low weight of the new bicycle hub benefits the overall weight of the bicycle in which such bicycle hubs are installed. The disclosed bicycle hub may, appropriately modified, can be used for the rear as well as the front wheels.

The following detailed description of the invention is merely exemplary in nature and is not intended to limit the invention or the application and uses of the invention. Furthermore, there is no intention to be bound by any theory presented in the preceding background of the invention or the following detailed description of the invention.

BRIEF DESCRIPTION OF THE DRAWINGS

FIG. 1 is a longitudinal section of an embodiment of a bicycle hub.

FIG. 2 and FIG. 3 are side views of the bicycle hub as in FIG. 1.

DETAILED DESCRIPTION

Figure 6:
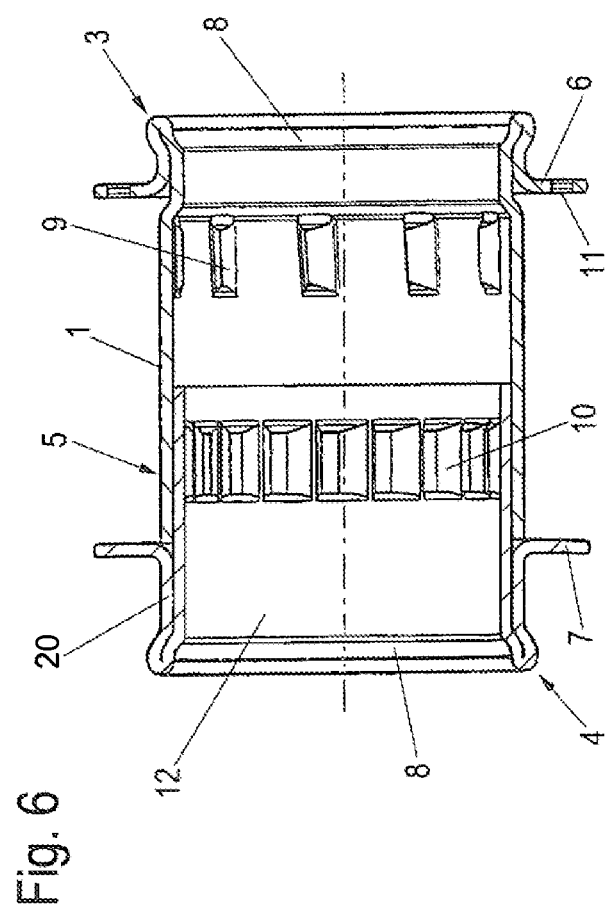
FIG. 6 shows a longitudinal section of an alternative embodiment of a bicycle hub.

FIGS. 1 and 6 show a bicycle hub comprising a first hub element 1 and a second hub element 2; 20 which are connected with one another through friction fit. Each hub element 1, 2; 20 has a respective end section 3, 4 on the side opposite to one another, in which internal ball tracks 8 have been shaped for accepting roller balls.

Each end section 3, 4 comprises a double wall in the ball track area 8. The outer wall of the double wall has a flange 6, 7 attached to it. The flange 6, 7 comprises holes 11 for mounting spokes. The double wall extends further, at least up to a brake shoe area 12 that is defined by the brake shoes (not shown) fitted for a back-pedal brake located inside the bicycle hub.

The flanges 6, 7 are connected to each other at a predetermined distance by a sleeve 5. As shown in FIG. 1 sleeve 5 may be integral with the end section 3 of the first hub element 1.

The bicycle hub is produced by the following process steps:

Deep drawing each of the two hub elements 1, 2; 20 from separate round blanks

Reverse drawing the tubular end sections 3, 4 of the respective hub elements, thus forming an inner wall and a closely fitting abutting outer wall into a double wall.

Bending the outer wall into the radially circumferential flange 6, 7.

Forming the inner wall of the end section 3, 4 into a ball track 8.

Perforating the flange 6, 7.

Inserting the two hub elements 1, 2; 20 into each other.

In addition, two circumferential sets of internal gear teeth 9, 10 that are arranged in parallel to and at a distance from one another are provided for a hub gear, of which one is functionally assigned to a back-pedal brake with a freewheel. Similar to the other deformations, the internal gear teeth 9, 10 are also produced by cold forming, whereby the teeth in the sets of internal gear teeth 9, 10 are pressed in from the outside.

In the example shown in FIG. 1, both sets of internal gear teeth 9, 10 have been provided in the first hub element 1.

The ball track 8 of the second hub element 2 is produced by drawing the inner wall of the double wall formed in this area, whose outer wall preferably fits closely with and adjacently to the sleeve 5 by means of friction fit.

The free front side of the ball track 8 is supported on the front side of the sleeve 5.

Figure 4:
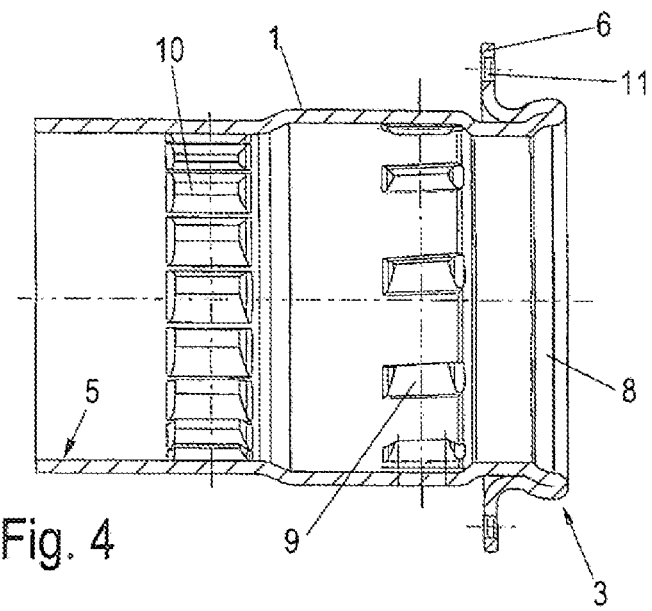
FIG. 4 is a longitudinal section of bicycle hub as in FIG. 1

In FIG. 4, the first hub element 1 can be seen in detail, corresponding to the embodiment in FIG. 1. It can be seen that the flange 6 is made by reverse drawing the hub element 1. Hub element 1 itself is manufactured by deep drawing, and extends radially outward, at a predetermined distance from the end.

Figure 5:
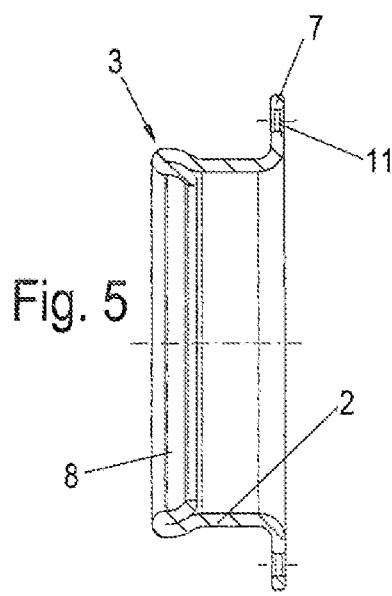
FIG. 5 illustrated an additional detail of the bicycle hub, in a longitudinal section.

FIG. 5 shows the second hub element 2 in detail, which is pressed onto the cylindrical sleeve 5 of the first hub element 1, until the free front side of the ball track 8 contacts the front side of the sleeve 5. The inner wall of the second hub element 2 does not extend in an axially inner direction to the radially extending flange 7.

Another embodiment of the new bicycle hub is shown in FIG. 6. Here, the first hub element 1 comprises only one set of internal gear teeth 9, while another set of internal gear teeth 10 is formed in the second hub element 20. The inner wall of the second hub element 20 extends in an axially inner direction beyond the radially extending flange 7.

The flange 7 directed radially outward is formed by reverse drawing the end section 4 of the second hub element 20 and bending it. The inner wall of the second hub element 20 forms an inner wall with the first hub element 1 in the overlapping area, while the front side of the first hub element 1 is in contact with the flange 7. Flange 7 thus acts as a stop when the first hub element 1 is pushed onto the second hub element 20. Both walls thus form a part of the sleeve 5.

The two-piece design of the illustrated embodiment allows providing the second hub element 20—that accommodates the back-pedal brake—in a uniform, that is, ready-to-assemble manner, while providing the first hub element 1—that accommodates the hub gear—on the basis of a different number of gears depending on the design of the hub gear, i.e., by varying its diameter. Only the overlapping area required for friction fitting of the first hub element 1 is matched with it for every variation in design.

Figure 7:
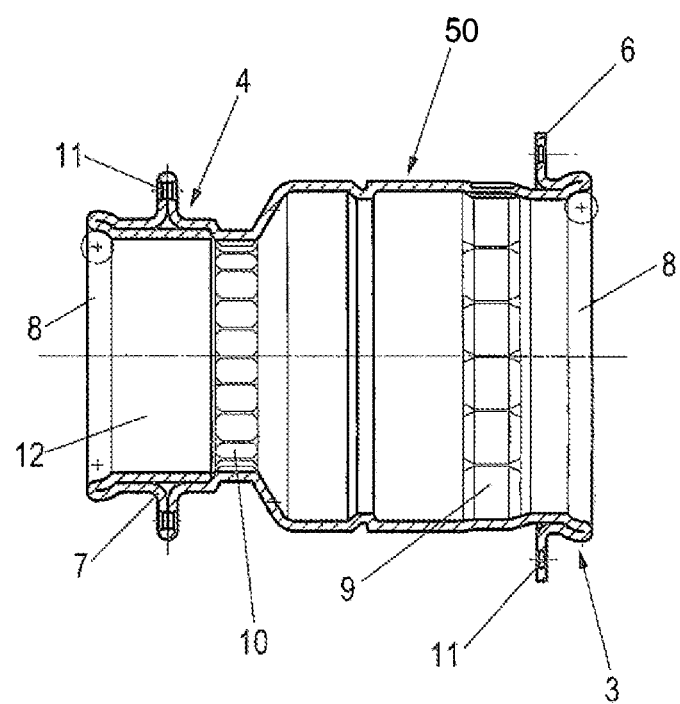
FIG. 7 shows a longitudinal section of a third embodiment of a bicycle hub.

FIG. 7 shows a bicycle hub formed as a single piece from a round blank. It shows the right end section 3 with its flange 6, formed correspondingly to that end section shown in FIGS. 1 and 6. On the other hand, the flange 7 at the opposite end section 4 is manufactured by folding, so that it has a double-ply design, while the double wall of the end section 4 is manufactured by drawing and feeding back the sleeve 50 in an axially parallel manner, whereby the double wall of the end section 4 overlaps the flange 7. In this design variation, the internal gear teeth 9, 10 are provided in the sleeve 50 at a predetermined distance from one another.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

LIST OF REFERENCE DRAWINGS

1 Hub element
2; 20 Hub element
3 End section
4 End section
5; 50 Sleeve
6 Flange
7 Flange
8 Ball track
9 Internal gear teeth
10 Internal gear teeth
11 Hole
12 Brake Show Area.

The invention claimed is:

1. A bicycle hub made of shaped sheet metal, comprising two end sections connected at a predetermined distance by a sleeve, wherein each end section comprises:
    a double wall made of an inner wall and a radially abutting coaxial outer wall, the inner wall and the outer wall being formed from a single piece of sheet metal;
    a radially outwardly extending flange comprising holes for accommodating spokes, the radially outwardly extending flange being connected to the outer wall; and
    a ball track formed in the double wall by a change in diameter of the inner wall and a corresponding change in diameter of the abutting outer wall.

2. The bicycle hub as in claim 1, wherein the two end sections and the sleeve are made from a single piece of sheet metal.

3. The bicycle hub as in claim 1, wherein the hub comprises two or more hub elements which are connected by friction fit.

4. The bicycle hub as in claim 1 wherein the double wall extends axially inwardly and overlaps a brake shoe of a back-pedal brake disposed within the hub.

5. The bicycle hub as in claim 1, wherein each of the two end sections and the sleeve are separate parts that are connected to each other.

6. The bicycle hub as in claim 1, wherein one of the two end sections and the sleeve are made of a single piece of sheet metal.

7. The bicycle hub as in claim 1, further comprising internal gear teeth.

8. A method for forming an end section of a bicycle hub comprising:
    reverse drawing a single piece of sheet metal to form a substantially cylindrical double wall comprising an inner wall and a radially abutting coaxial outer wall;
    forming a ball track in the substantially cylindrical double wall by radially expanding the inner wall and the radially abutting outer wall;
    bending or folding the outer wall to form a flange; and
    perforating the flange to create holes for inserting spokes.

9. The method for forming the end section of the bicycle hub as in claim 8 wherein the single piece of sheet metal is a round blank, further comprising the steps of deep drawing the round blank into a cup having a base and removing the base from the cup by punching.

10. The method for forming the end section of a bicycle hub as in claim 8, wherein the step of forming a ball track in the double wall without cutting is performed by drawing.

11. A method for producing a bicycle hub comprising the steps of:
    deep drawing a sleeve from a round sheet metal blank; and
    forming two end sections onto the sleeve by
        reverse drawing an end of the sleeve to form a substantially cylindrical double wall comprising an inner wall and a radially abutting coaxial outer wall;
        forming a ball track in the substantially cylindrical double wall by radially expanding the inner wall and the radially abutting outer wall;
        bending or folding the outer wall to form a flange; and
        perforating the flange to create holes for inserting spokes.

12. The method for producing a bicycle hub as in claim 11, further comprising the step of forming a circumferential set of internal gear teeth in the sleeve.

13. The method for producing a bicycle hub as in claim 12, wherein the step of forming the circumferential set of internal gear teeth is performed by pressing the internal gear teeth into the sleeve from the outside.

14. The bicycle hub as in claim 1, wherein the inner wall of at least one of the two end sections extends from an axial outer end of the end section to the flange.

* * * * *